(12) United States Patent
Webb et al.

(10) Patent No.: US 10,267,173 B2
(45) Date of Patent: Apr. 23, 2019

(54) GAS TURBINE ENGINE WITH SEAL INSPECTION FEATURES

(71) Applicant: Rolls-Royce Corporation, Indianapolis, IN (US)

(72) Inventors: Michael D. Webb, Indianapolis, IN (US); Neil A. Clayton, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 765 days.

(21) Appl. No.: 14/857,168

(22) Filed: Sep. 17, 2015

(65) Prior Publication Data

US 2016/0115816 A1 Apr. 28, 2016

Related U.S. Application Data

(60) Provisional application No. 62/067,252, filed on Oct. 22, 2014.

(51) Int. Cl.
| | | |
|---|---|---|
| *F01D 11/12* | (2006.01) | |
| *F01D 5/02* | (2006.01) | |
| *F01D 5/22* | (2006.01) | |
| *F01D 5/28* | (2006.01) | |

(52) U.S. Cl.
CPC .............. *F01D 11/122* (2013.01); *F01D 5/02* (2013.01); *F01D 5/225* (2013.01); *F01D 5/282* (2013.01); *F01D 5/284* (2013.01); *F05D 2220/32* (2013.01); *F05D 2230/31* (2013.01); *F05D 2230/90* (2013.01); *F05D 2240/11* (2013.01); *F05D 2240/307* (2013.01); *F05D 2260/80* (2013.01); *F05D 2300/6033* (2013.01); *F05D 2300/611* (2013.01); *Y02T 50/672* (2013.01)

(58) Field of Classification Search
CPC ........ F01D 17/148; F01D 17/162; F01D 11/12; F01D 11/122; F01D 11/14
See application file for complete search history.

(56) References Cited

U.S. PATENT DOCUMENTS

| | | | |
|---|---|---|---|
| 6,838,157 B2 * | 1/2005 | Subramanian | ............ C23C 4/18 427/446 |
| 7,270,890 B2 * | 9/2007 | Sabol | ........................ C23C 4/18 416/61 |
| 7,584,669 B2 | 9/2009 | Dankert et al. | |
| 7,726,936 B2 * | 6/2010 | Keller | ..................... F01D 11/12 415/173.4 |
| 7,891,938 B2 | 2/2011 | Herron et al. | |
| 8,061,978 B2 | 11/2011 | Tholen et al. | |

(Continued)

FOREIGN PATENT DOCUMENTS

WO 2013050688 A1 4/2013

OTHER PUBLICATIONS

Extended European Search Report, European Application No. 15186255. 4-1610, search completed Mar. 7, 2016 and dated Mar. 31, 2016, 10 pages.

*Primary Examiner* — Woody A Lee, Jr.
(74) *Attorney, Agent, or Firm* — Barnes & Thornburg LLP (57) ABSTRACT

A turbine shroud of a turbine of a gas turbine engine and methods of making the turbine shroud are disclosed. The turbine shroud is configured to direct products of a combustion reaction in a combustor of the gas turbine engine toward a plurality of rotatable turbine blades of the turbine to cause the plurality of turbine blades to rotate.

12 Claims, 4 Drawing Sheets

(56) References Cited

U.S. PATENT DOCUMENTS

| | | | |
|---|---|---|---|
| 8,177,494 B2 | 5/2012 | Ward et al. | |
| 8,313,283 B2 | 11/2012 | Morimoto | |
| 8,322,973 B2 | 12/2012 | Shang et al. | |
| 8,684,669 B2 | 4/2014 | Chehab et al. | |
| 2003/0020496 A1* | 1/2003 | Eyraud | F01D 11/122 324/699 |
| 2007/0285110 A1* | 12/2007 | Nigmatulin | F01D 11/08 324/699 |
| 2009/0148278 A1* | 6/2009 | Allen | C23C 26/00 415/173.4 |
| 2012/0207586 A1* | 8/2012 | Chehab | F01D 11/122 415/118 |
| 2013/0084167 A1* | 4/2013 | Hewitt | F01D 5/288 415/173.1 |
| 2014/0076037 A1 | 3/2014 | Warren et al. | |
| 2014/0199163 A1* | 7/2014 | Lee | C23C 28/04 415/174.4 |
| 2015/0086334 A1* | 3/2015 | Jactat | F04D 27/001 415/118 |

* cited by examiner

GAS TURBINE ENGINE WITH SEAL INSPECTION FEATURES

CROSS REFERENCE TO RELATED APPLICATIONS

This application claims priority to and the benefit of U.S. Provisional Patent Application No. 62/067,252, filed 22 Oct. 2014, the disclosure of which is now expressly incorporated herein by reference.

FIELD OF THE DISCLOSURE

The present disclosure relates generally to gas turbine engines, and more specifically to turbine shrouds included in gas turbine engines.

BACKGROUND

Gas turbine engines typically include a compressor, a combustor, and a turbine. The compressor compresses air drawn into the engine and delivers high pressure air to the combustor. In the combustor, fuel is mixed with the high pressure air and the air/fuel mixture is ignited. Products of the combustion reaction in the combustor are directed into the turbine where work is extracted to drive various components of the gas turbine engine.

Turbines typically include alternating stages of static vane assemblies and rotatable wheel assemblies. The rotatable wheel assemblies include disks carrying blades that are coupled to the disks. When the rotatable wheel assemblies turn in response to receiving the combustion reaction products, tips of the blades move along ceramic blade tracks included in static turbine shrouds surrounding the rotating wheel assemblies; thereby, work is extracted in the form of mechanical energy.

Clearance between the tips of the blades and the static turbine shrouds affects gas turbine engine operating efficiency. Optimizing the clearance between the tips of the blades and the static shrouds to maximize gas turbine engine operating efficiency, however, can present challenges. For example, to determine the clearance between the blade tips and the static shrouds, disassembly of the gas turbine engine is often required to inspect those components, thereby resulting in increased downtime during the repair and/or testing of gas turbine engines.

SUMMARY

The present disclosure may comprise one or more of the following features and combinations thereof.

According to one aspect of the present disclosure, a turbine assembly includes a turbine wheel assembly having a disk and a plurality of blades that extend outwardly from the disk in a radial direction away from an axis, and a turbine shroud that extends around the blades of the turbine wheel assembly to block gasses from passing over the blades during operation of the turbine assembly. The turbine shroud includes a plurality of blade track segments arranged circumferentially adjacent to one another about the axis to form a ring around the axis. Each blade track segment includes a runner that forms a primary track surface facing the axis and spaced a first radial distance from the axis. At least one of the plurality of blade track segments includes a marker arranged radially outward of the blades included in the turbine wheel assembly that forms a plurality of rub indication surfaces each spaced a different distance from the axis than the primary track surface so that an approximate rub depth of the turbine wheel assembly into the blade track caused by turbine wheel assembly rotation within the turbine shroud during operation of the turbine assembly can be determined by visually observing the marker.

In some embodiments, the marker may include a plurality of pedestals that each form one of the rub indication surfaces, and each rub indication surface may be closer to the axis than the primary track surface. The marker may include a plurality of cutouts that each form one of the rub indication surfaces, and each rub indication surface may be farther from the axis than the primary track surface.

In some embodiments, the at least one of the plurality of blade tracks may include a plurality of markers that each form a plurality of rub indication surfaces, and each of the plurality of rub indication surfaces may be spaced a different distance from the axis than the primary track surface.

According to another aspect of the present disclosure, a turbine shroud includes a plurality of blade track segments arranged circumferentially adjacent to one another about an axis to form a ring around the axis. Each blade track segment includes a runner that forms a primary track surface facing the axis and spaced a first radial distance from the axis. At least one of the plurality of blade track segments includes a marker that forms a plurality of rub indication surfaces each spaced a different distance from the axis than the primary track surface.

In some embodiments, the marker may include a plurality of pedestals that each form one of the rub indication surfaces, and each rub indication surface may be closer to the axis than the primary track surface. The marker may include a plurality of cutouts that each form one of the rub indication surfaces, and each rub indication surface may be farther from the axis than the primary track surface. The plurality of cutouts may be arranged axially forward of the plurality of pedestals.

In some embodiments, the at least one of the plurality of blade track segments may include a plurality of markers that each forms a plurality of rub indication surfaces, and each of the plurality of rub indication surfaces may be spaced a different distance from the axis than the primary track surface. The at least one of the plurality of blade track segments may include three markers spaced circumferentially from one another.

In some embodiments, each of the blade track segments may include a marker that forms a plurality of rub indication surfaces, and each of the plurality of rub indication surfaces may be spaced a different distance from the axis than the primary track surface. In some embodiments, the runner of the at least one blade track segment may include a base portion and a coating applied to the base portion, and the coating may form the rub indication surfaces. The base portion of the runner may be made from a ceramic matrix composite material. Additionally, in some embodiments, the coating may form the primary track surface.

According to yet another aspect of the present disclosure, a method of making a turbine shroud includes arranging a plurality of blade track segments of the turbine shroud circumferentially adjacent to one another about an axis to form a ring around the axis, applying a protective coating to at least one of the blade track segments to form a primary track surface facing the axis and spaced a first radial distance from the axis, and forming a marker in the at least one blade track segment that forms a plurality of rub indication surfaces each spaced a different distance from the axis than the primary track surface of the at least one blade track segment.

In some embodiments, forming the marker may include forming a plurality of cutouts in the protective coating used to form the primary track surface of the at least one blade track segment that each form one of the rub indication surfaces. In some embodiments, (i) applying a protective coating to the at least one blade track segment to form the primary track surface may include applying a first protective coating layer to the at least one blade track segment to form the primary track surface and applying multiple coating layers to portions of the primary track surface of the at least one blade track segment, and (ii) forming the marker may include forming a plurality of pedestals in the multiple layers of coating applied to the portions of the primary track surface that each form one of the rub indication surfaces.

In some embodiments, applying a protective coating to the at least one blade track segment to form the primary track surface may include (i) applying a first protective coating layer to the at least one blade track segment to form the primary track surface and then (ii) masking the primary track surface of the at least one blade track segment to shield at least a masked portion of the primary track surface from multiple layers of protective coating that are applied to an unmasked portion of the primary track surface, and forming the marker may include forming a plurality of pedestals in the multiple layers of protective coating applied to the unmasked portion of the primary track surface that each form one of the rub indication surfaces. In some embodiments, applying a protective surface to the at least one blade track segment to form the primary track surface may include (i) applying a mask to the at least one blade track segment to shield at least one portion of the at least one blade track from a first protective coating layer that is applied to another portion of the at least one blade track to form the primary track surface, (ii) removing the mask from the one portion of the at least one blade track, (iii) applying another mask to the another portion of the at least one blade track, and (iv) applying multiple layers of protective coating to the one portion of the at least one blade track, and forming the marker may include forming a plurality of cutouts in the multiple layers of protective coating applied to the one portion of the at least one blade track that each form one of the rub indication surfaces.

BRIEF DESCRIPTION OF THE DRAWINGS

FIGS. 6-8 are perspective views of the inspection features of FIG. 3 showing varying amounts of rub caused by degrees of clearance between the blades of the rotatable wheel assembly and the static shroud as indicated by the inspection features;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
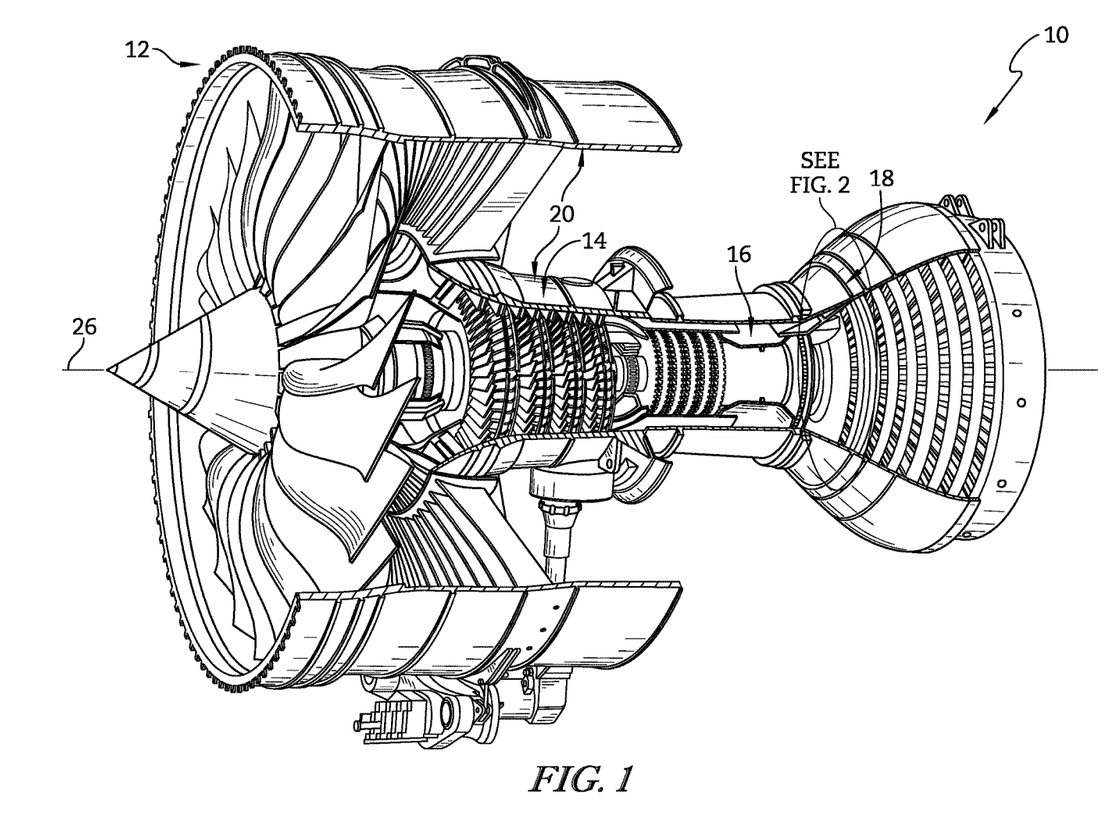
FIG. 1 is a cut-away perspective view of a gas turbine engine.

Referring now to FIG. 1, a cut-away view of an illustrative aerospace gas turbine engine 10 is shown. The gas turbine engine 10 includes a fan 12, a compressor 14, a combustor 16, and a turbine 18, each of which is surrounded and supported by a metallic case 20. The compressor 14 compresses and delivers air to the combustor 16. The combustor 16 mixes the compressed air with fuel, ignites the air/fuel mixture, and delivers the combustion products (i.e., hot, high-pressure gases) to the turbine 18. The turbine 18 converts the combustion products to mechanical energy (i.e., rotational power) that drives, among other things, the fan 12 and the compressor 14.

Figure 2:
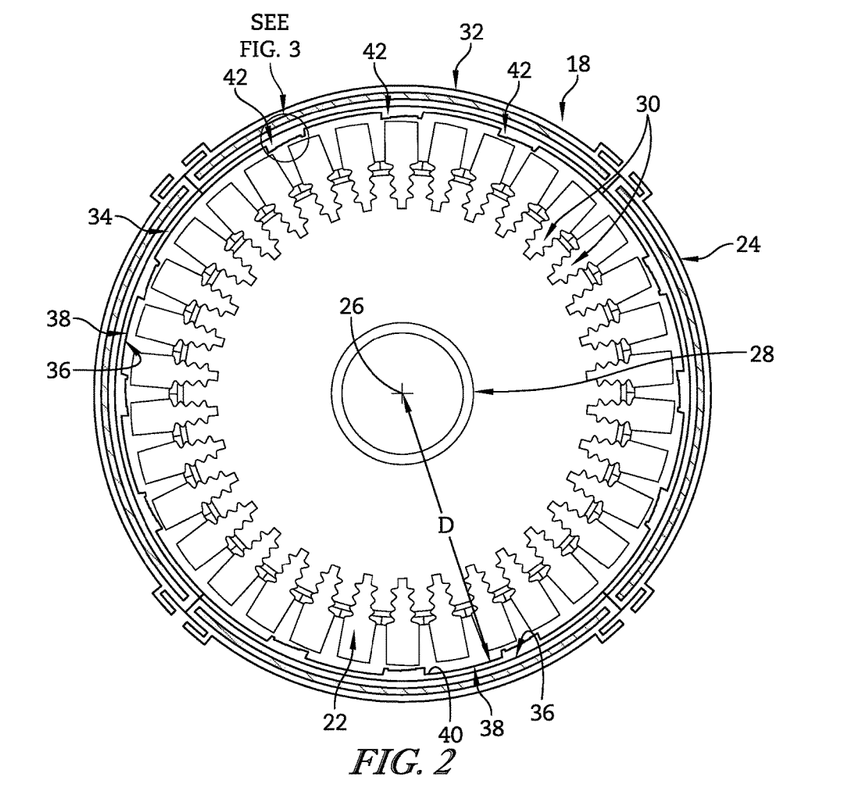
FIG. 2 is a front elevation view of a portion of a turbine included in the gas turbine engine of FIG. 1 showing a rotatable wheel assembly surrounded by a static shroud.

Referring now to FIG. 2, a front elevation view of a portion of the turbine 18 is shown. The turbine 18 is also referred to herein as the turbine assembly 18. The turbine assembly 18 includes a turbine wheel assembly 22 and a turbine shroud 24 surrounding the turbine wheel assembly 22. The turbine shroud 24 blocks combustion products from passing over the turbine wheel assembly 22 without causing the turbine wheel assembly 22 to rotate, thereby contributing to lost performance within the gas turbine engine 10.

The turbine wheel assembly 22 includes a disk 28 and a plurality of blades 30 extending outwardly from the disk 28 in a radial direction away from an axis 26 as shown in FIG. 2. The turbine shroud 24 includes a metallic carrier 32 and a blade track 34 having a plurality of arcuate blade track segments 36. The blade track segments 36 are arranged circumferentially adjacent to one another about the axis 26 to form the annular blade track 34 around the axis 26. The metallic carrier 32 is coupled to the blade track 34 around the axis 26. In operation, the metallic carrier 32 is coupled to the metallic case 20 shown in FIG. 1 so that the carrier 32 supports the blade track 34 relative to the metallic case 20.

The blade track 34 is illustratively constructed of a ceramic matrix composite material. In one example, the ceramic matrix composite material may include silicon-carbide fibers formed into fabric sheets and a silicon-carbide matrix. In another example, the ceramic matrix composite material may include another ceramic-based material that including reinforcing fibers and a matrix material. In other embodiments, the blade track 34 may be made from metallic materials or any other suitable material.

Each blade track segment 36 of the blade track 34 includes a runner 38 as shown in FIG. 2. The runner 38 of each blade track segment 36 forms a primary track surface 40 facing the axis 26, and a portion of the primary track surface 40 is spaced a radial distance D from the axis 26. The axis 26 passes through a center of the disk 28 as suggested in FIG. 2.

Each blade track segment 36 is formed to include markers 42 that provide inspection features arranged radially outward of the turbine wheel assembly 22 as shown in FIG. 2. As shown in FIG. 2, each blade track segment 36 illustratively includes a plurality of markers 42 spaced circumferentially from one another about the axis 26 at predetermined distances. As described in greater detail below, an approximate rub depth of the blades 30 into the blade track 34 caused by rotation of the turbine wheel assembly 22 within the turbine shroud 24 during operation of the gas turbine engine 10 can be determined by visually observing the markers 42.

Each blade track segment 36 illustratively includes three markers 42 as shown in FIG. 2. The three markers 42 are illustratively located on each blade track segment 36 to indicate different rub depths at particular locations of each blade track segment 36. As each blade track segment 36 is exposed to the operating temperatures of the gas turbine engine 10, the runner 38 of each segment 36 may flatten. For instance, as each segment 36 is exposed to the operating temperatures of the gas turbine engine 10, the three markers 42 may indicate rub depth at locations near the center of each segment 36 and at opposite ends of each segment 36 so that the amount of flattening can be determined and accounted for. In other embodiments, each blade track segment 36 may include more or less than three markers 42.

The markers 42 of the blade track segments 36 of the blade track 34 are circumferentially spaced about the axis 26 as shown in FIG. 2. The markers 42 are illustratively located about the axis 26 to indicate rub depth of the blades 30 into the blade track 34 at various positions about the axis 26. At the position spaced directly radially below the axis 26, the markers 42 indicate the greatest amount of rub depth due to the force of gravity. Conversely, at the position spaced directly radially above the axis 26, the markers 42 indicate the least amount of rub depth. At the positions spaced directly radially left and right of the axis 26, the rub depth 42 indicated by the markers 42 may be used to determine the concentricity of the turbine wheel assembly 22 and the blade track 34 about the axis 26 during operation of the engine 10.

Figure 3:
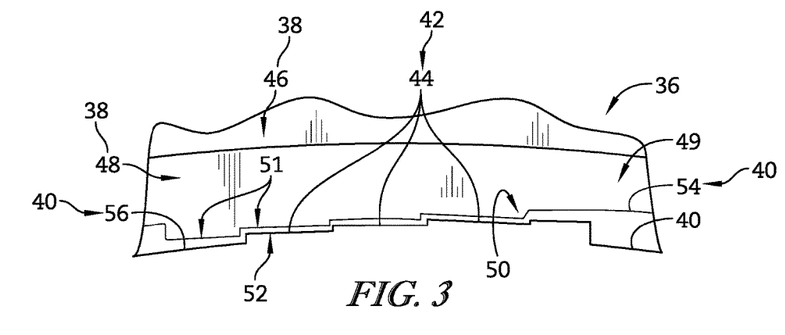
FIG. 3 is a detail view of the static shroud of FIG. 2 showing inspection features of the static shroud.

Each of the markers 42 forms a plurality of rub indication surfaces 44 as best seen in FIG. 3. Each rub indication surface 44 is spaced a different radial distance from the axis 26 than the portion of the primary track surface 40. The rub indication surfaces 44 are abradable and indicate interference or clearance between the blades 30 and the blade track 34 during operation of the gas turbine engine 10.

Rub (or a lack thereof) between the blades 30 and the blade track 34 may be determined by visually observing the markers 42 using an optical device such as a borescope. As such, in the illustrative embodiment, interference, if any, between the blades 30 and the blade track 34 may be determined by visually observing the markers 42 without disassembling the gas turbine engine 10 to examine the blades 30 and the blade track 34.

Referring now to FIG. 3, one of the markers 42 of one of the blade track segments 36 is shown in detail. The runner 38 of the blade track segment 36 illustratively includes a base portion 46 formed from a ceramic matrix composite material and a coating 48 applied to the base portion 46. The primary track surface 40 is illustratively formed from the coating 48. In addition, the marker 42 is illustratively formed from the coating 48 such that the coating 48 forms the rub indication surfaces 44 of the blade track segment 36. The coating 48 is illustratively abradable and adapted to wear when the blades 30 rub into the coating 48 such that interference between the blades 30 and the blade track 34 can be determined as indicated above. The coating 48 may be a protective coating such as an environmental barrier coating adapted to resist degradation of the base portion 46 during operation of the gas turbine engine 10. In other embodiments, the coating 48 may be comprise any other suitable material.

In other embodiments, rather than being formed in the coating 48, the markers 42 of each one of the blade track segments 36 may be formed directly into the base portion 46. In that way, the primary track surface 40 and the rub indication surfaces 44 may be formed from the base portion 46 of each blade track segment 36.

Each of the markers 42 illustratively includes a plurality of pedestals 50 and a plurality of cutouts 52. As shown in FIG. 3, each of the plurality of pedestals 50 forms one of the rub indication surfaces 44, and each of the plurality of cutouts 52 forms one of the rub indication surfaces 44. The plurality of pedestals 50 (sometimes called towers) are arranged in a stepped configuration so that each of the rub indication surfaces 44 formed by the pedestals 50 is positioned a different radial distance from the axis 26 than any of the other rub indication surfaces 44 formed by the pedestals 50. Similarly, the rub indication surfaces 44 formed by the cutouts 52 (sometimes called windows) are arranged in a stepped configuration so that each of the rub indication surfaces 44 formed by the cutouts 52 is positioned a different radial distance from the axis 26 than any of the other rub indication surfaces 44 formed by the cutouts 52.

In other embodiments, each of the markers 42 may include only the plurality of pedestals 50 rather than both the plurality of pedestals 50 and the plurality of cutouts 52. In other embodiments still, each of the markers 42 may include only the plurality of cutouts 52 rather than both the plurality of pedestals 50 and the plurality of cutouts 52.

The rub indication surfaces 44 formed by the plurality of pedestals 50 are illustratively closer to the axis 26 than a generally frustoconical portion 54 of the primary track surface 40 as shown in FIG. 3. The rub indication surfaces 44 formed by the plurality of cutouts 52 are illustratively farther from the axis 26 than a generally cylindrical portion 56 of the primary track surface 40. In other embodiments, the rub indication surfaces 44 formed by the plurality of pedestals 50 may be farther from the axis 26 than the portion 54.

Referring again to FIG. 3, a method of making the turbine shroud 24 includes arranging the plurality of blade track segments 36 circumferentially adjacent to one another about the axis 26 to form a ring around the axis 26. The method also includes applying the protective coating 48 to at least one of the blade track segments 36 to form the primary track surface 40 facing the axis 26 and spaced a first radial distance D from the axis 26. The method also includes forming the marker 42 in the at least one blade track segment 36 that forms the plurality of rub indication surfaces 44 each spaced a different distance from the axis 26 than the primary track surface 40.

In the above described method, forming the marker 42 may include forming the plurality of cutouts 52 in the protective coating 48 used to form the primary track surface 40 that each form one of the rub indication surfaces 44.

In the above described method, applying the protective coating 48 to the at least one blade track segment 36 may include applying a first protective coating layer 49 to the at least one blade track segment 36 to form the primary track surface 40. Applying the protective coating 48 to the at least one blade track segment 36 may also include applying multiple coating layers 51 to portions of the primary track surface 40 of the at least one blade track segment 36. Forming the marker 42 may include forming the plurality of pedestals 50 in the multiple coating layers 51 applied to the portions of the primary track surface 40 that each form one of the rub indication surfaces 44.

In the above described method, applying the protective coating 48 to the at least one blade track segment 36 may include applying the first protective coating layer 49 to the at least one blade track segment 36 to form the primary track surface 40. Applying the protective coating 48 to the at least one blade track segment 36 may also include masking the primary track surface 40 to shield at least a masked portion of the primary track surface 40 from the multiple coating layers 51 that are applied to an unmasked portion of the primary track surface 40. Forming the marker 42 may include forming the plurality of pedestals 50 in the multiple layers of coating 51 applied to the unmasked portion of the primary track surface 40 that each form one of the rub indication surfaces 44.

In the above described method, applying the protective coating 48 to the at least one blade track segment 36 may include applying a mask to the at least one blade track segment 36 to shield at least one portion of the at least one blade track 36 from the protective coating layer 49 that is applied to another portion of the at least one blade track 36. Applying the protective coating 48 to the at least one blade track segment 36 may include removing the mask from the one portion of the at least one blade track 36. Applying the protective coating 48 to the at least one blade track segment 36 may include applying another mask to the another portion of the at least one blade track 36. Applying the protective coating 48 to the at least one blade track segment 36 may include applying the multiple layers of coating 51 to the one portion of the at least one blade track 36. Forming the marker 42 may include forming the plurality of cutouts 52 in the multiple layers of coating 51 applied to the one portion of the at least one blade track 36 that each form one of the rub indication surfaces 44.

Figure 4:
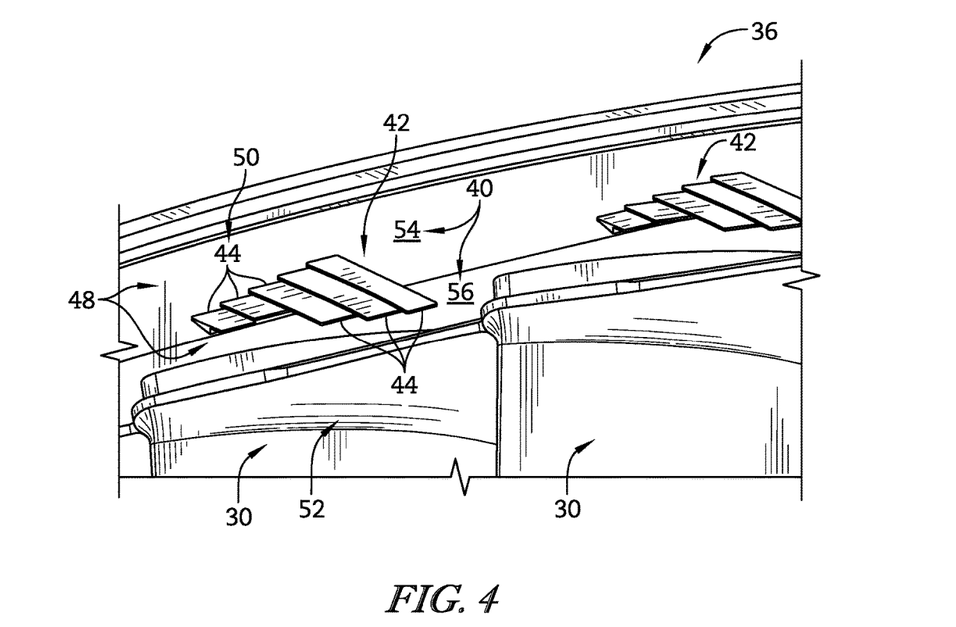
FIG. 4 is a detail perspective view showing the inspection features of FIG. 3 adjacent to a plurality of blades of the rotatable wheel assembly.
Figure 6:
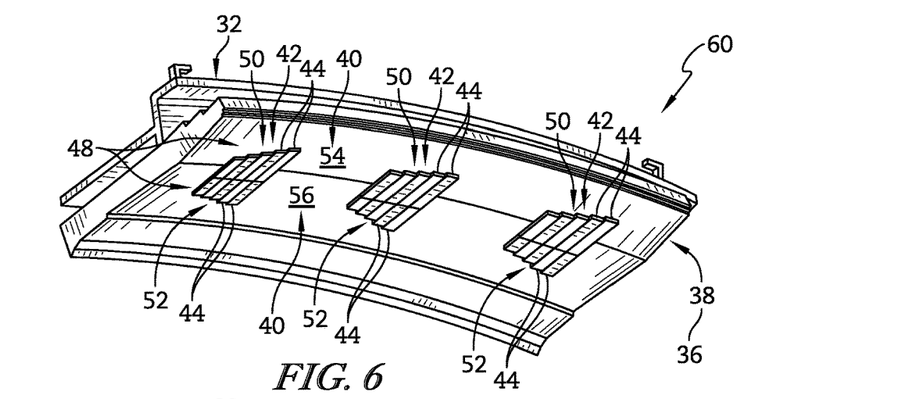
FIG. 6 in particular is a perspective view of the inspection features when little to no rub has occurred between the blades and the static shroud.
Figure 7:
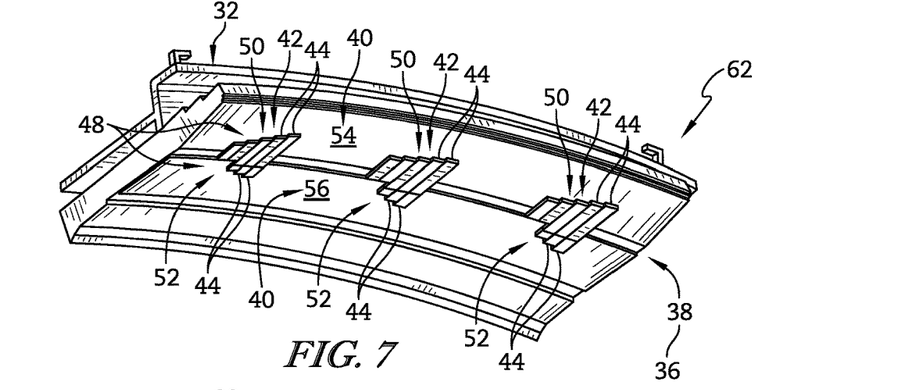
FIG. 7 in particular is a perspective view of the inspection features when an amount of rub greater than the little or no rub shown in FIG. 6 has occurred between the blades and the static shroud.
Figure 8:
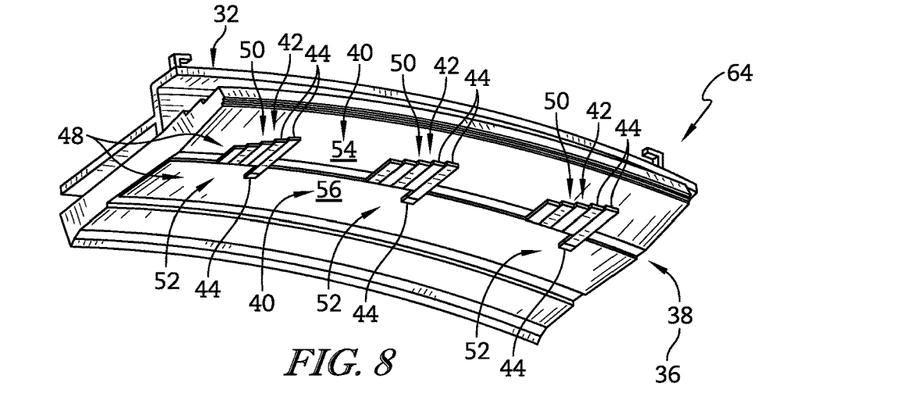
FIG. 8 in particular is a perspective view of the inspection features when an amount of rub greater than the rub shown in FIG. 7 has occurred between the blades and the static shroud.

Referring now to FIG. 4, a pair of markers 42 of one of the blade track segments 36 are shown adjacent to a pair of blades 30 of the turbine wheel assembly 22. The plurality of pedestals 50 of the pair of markers 42 are formed in the coating 48 applied to the generally frustoconical portion 54 of the primary track surface 40. The plurality of cutouts 52 of the pair of markers 42 are formed in the coating 48 applied to the generally cylindrical portion 56 of the primary track surface 40. As best seen in FIGS. 6-8, the generally frustoconical portion 54 and the plurality of pedestals 50 are located aft of the generally cylindrical portion 56 and the plurality of cutouts 52 along the axis 26.

The rub indication surfaces 44 formed from the plurality of pedestals 50 are shown substantially intact in FIG. 4. As such, upon visual observation, the marker 42 indicates a lack of rub or interference between the generally frustoconical portion 54 of the primary track surface 40 and the blades 30. In contrast, the two left-most rub indication surfaces 44 formed from the plurality of cutouts 52 of each marker 42 are worn so that they are not visible. As such, upon visual observation, the marker 42 indicates rub or interference between the generally cylindrical portion 56 of the primary track surface 40 and the blades 30.

Figure 5:
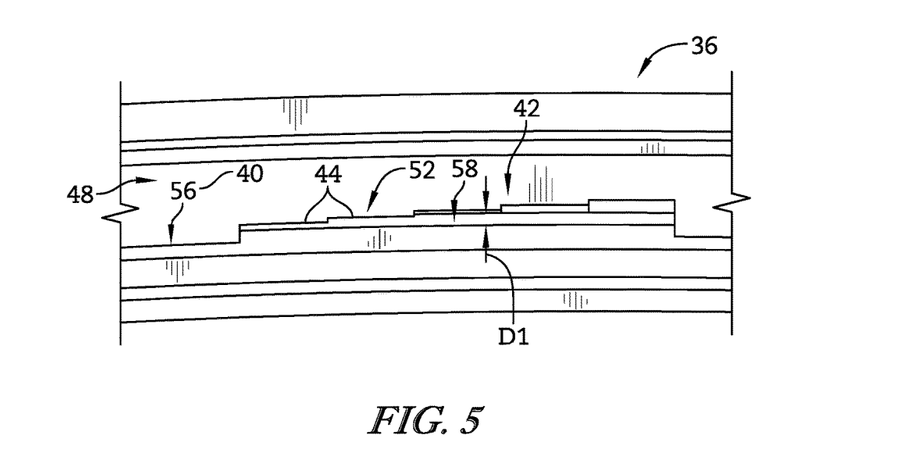
FIG. 5 is an elevation view of the inspection features of FIG. 3 showing clearance between the blades of the rotatable wheel assembly and the static shroud indicated by the inspection features.

Referring now to FIG. 5, the stepped configuration of the rub indication surfaces 44 formed from the plurality of cutouts 52 of one of the markers 42 is shown in detail. The plurality of cutouts 52 illustratively form five rub indication surfaces 44 spaced circumferentially from one another about the axis 26 at predetermined locations. Each of the rub indication surfaces 44 of the cutouts 52 has a predetermined thickness. As shown in FIG. 5, contiguous rub indication surfaces 44 are spaced a predetermined radial distance (i.e., away from the axis 26) from one another. The predetermined radial distance is illustratively 0.2 millimeters.

In the stepped configuration of the rub indication surfaces 44 formed by the cutouts 52 shown in FIG. 5, the thicknesses of the surfaces 44 increase from left to right. Similarly, the radial distances of the rub indication surfaces 44 from the generally cylindrical portion 56 increase from left to right. In that way, the illustrative configuration minimizes the degree that coating 48 abraded from one rub indication surface 44 is deposited onto another rub indication surface 44. The illustrative configuration thereby enhances the visibility of the rub into each surface 44 and facilitates the accurate measurement of the rub depth using the markers 42.

A rubbed portion 58 of the marker 42 extends entirely over the predetermined thicknesses of the two left-most rub indication surfaces 44 as shown in FIG. 5. The two left-most rub indication surfaces 44 have therefore been completely worn away such that they are not visible in FIG. 4. In contrast, the rubbed portion 58 does not extend entirely over the predetermined thicknesses of the three right-most rub indication surfaces 44. The three right-most rub indication surfaces 44 have not been completely worn away and are therefore visible in FIG. 4. The rub depth indicated by the marker 42 is slightly greater than the thickness of the second rub indication surface 44 from the left and slightly less than the thickness of the third rub indication surface 44 from the right as shown in FIG. 5.

Referring now to FIGS. 6-8, various degrees of rub depth (or lack thereof) between the turbine blades 30 and one blade track segment 36 are shown. As discussed in greater detail below, a no rub state 60 is shown in FIG. 6, a medium rub state 62 is shown in FIG. 7, and a deep rub state 64 is shown in FIG. 8. In each of FIGS. 6-8, the rub indication surfaces 44 formed by the plurality of pedestals 50 are substantially intact, indicating a lack of rub or interference between the generally frustoconical portion 54 of the primary track surface 40 and the blades 30.

Referring now to FIG. 6, the rub indication surfaces 44 formed by the plurality of cutouts 52 are shown substantially intact in the no rub state 60. As such, upon visual observation, the markers 42 indicate a lack of rub or interference between the generally cylindrical portion 56 of the primary track surface 40 and the blades 30. The blades 30 therefore do not rub into the blade track 34 in the no rub state 60.

Referring now to FIG. 7, the two left-most rub indication surfaces 44 of each marker 42 formed by the plurality of cutouts 52 are worn so that they are not visible in the medium rub state 62. As such, upon visual observation, the markers 42 indicate interference between the generally cylindrical portion 56 of the primary track surface 40 and the blades 30. The blades 30 therefore rub into the blade track 34 in the medium rub state 62.

Referring now to FIG. 8, the four left-most rub indication surfaces 44 of each marker 42 formed by the plurality of cutouts 52 are worn so that they are not visible in the deep rub state 64. As such, upon visual observation, the markers 42 indicate interference between the generally cylindrical portion 56 of the primary track surface 40 and the blades 30. The blades 30 therefore rub into the blade track 34 in the deep rub state 64 to a greater degree than the medium rub state 62.

The illustrative blade track 34 is adapted for use in an aircraft engine. In other embodiments, the blade track 34 may be used in test engines, demonstration or simulation engines, or engines used in other experimental environments. In any case, methods of testing a gas turbine engine that includes the blade track 34 may include inspecting the markers 42 before operating the engine to determine whether the markers 42 have been properly formed. The method may include operating the engine over a predetermined time period after inspecting the markers 42. The method may include using a borescope to inspect the markers 42 after the predetermined time period without disassembling the engine. The method may include determining whether the rub depth indicated by the markers 42 following the predetermined time period is desirable. The method may also include operating the engine over one or more additional time periods to further examine the rub depth indicated by the markers 42 and determine whether the rub depth indicated by the markers 42 following the one or more additional time periods is desirable.

The windows and towers disclosed herein allow for tip clearance and/or rub depth between a rotating blade and a static surface to be measured under inspection with a borescope. Therefore, relative movement between the components of the gas turbine engine can be understood between engine cycles without the need for engine disassembly.

In the development of gas turbine engines including shroudless technologies and new coating technologies, accurate understanding of the rub depth and relative movements between blades and segments is important. The windows and towers concept allows rub depth inspection to be carried out during borescope inspection of the components of such engines. This concept allows for clearance between blades and segments to be understood between engine cycles without having to disassemble the engine to examine the hardware.

The windows and towers have defined heights so that as the blade or rubbing feature rubs into the surface, it will rub down to a particular step. When examined under borescope inspection, the last step that has been rubbed through can be identified, and therefore the range of rub is defined between the step which has been rubbed through and the next deepest step.

The window or tower features can give a range of rub depth or clearance. For the measurement to be as accurate as possible, the window and tower steps should be inspected using a coordinate-measuring machine (CMM) prior to operating the engine.

In contrast to windows, which show how much the blade rubs into the surface of the segment, towers show how close the blade has got to the surface of the segment. Towers will be physically rubbed away, therefore creating a large tower surface. The same measurement range that applies to windows applies to towers.

The following considerations apply to the manufacturing and positioning of windows and towers: number of window/tower feature(s) per segment, application of windows and towers during the coating process, and orientation of the steps of the windows and towers. Three window/tower features per segment may be used to allow for flattening of the segment and highlight the flattening of the segment through different steps being rubbed at the edges of the segment compared to the center. Both windows and towers can be applied during the coating process through masking, or alternatively, the windows and towers can be machined independently or the coating/material being used. The orientation of the steps of the windows and towers should be such that the direction of the rub is into the blade to prevent rubbed material from filling up the window feature and reducing visibility of the rub.

The window and tower features provide a number of advantages. For instance, the window and tower features allow rub depth and clearance measurements to be taken without the engine being disassembled because the features are easily seen through borescope inspection. In addition, the window and tower features is cheap, quick to manufacture, and has proven to be effective in demonstration engines. Yet still, the window and tower features can be used to backup tip clearance probe measurements. Finally, the window and tower features allows rub depth progression to be monitored through regular borescope inspection between cycles in an engine test. Therefore, better understanding of relative movements of components of the engine can be achieved during different parts of the engine cycle.

The window and tower features allow for tip clearance control system flow to be tuned to obtain optimum cruise clearances for specific fuel consumption for all interfaces between blades and seal segments. The window and tower features allow the cruise clearance to be optimized for engines that already have break-in or take off rubs.

Tip clearance probes are available to measure tip clearance during engine operation. Windows and towers allow for tip clearance confirmation after each stage of the test. Therefore, windows and towers will not yield transient data but are much simpler, modify less components, and are cheaper to implement. No additional cooling is required for the window or tower features; therefore the baseline air system is not affected.

The window and tower features may be constructed during the coating process through masking. If the coating is built up using layers of material until full thickness is gained, it is possible to apply the window and tower features by masking appropriate areas during the coating process. This method is only possible if the layers of coating are sufficiently small enough to produce the height of the windows/towers required. This method will likely leave an as-coated condition of the features which can either be machined to achieve tighter tolerance or left in the as-coated condition.

The window and tower features can also be machined into the coating surface. Windows can be machined into a standard coated segment. Towers necessitate the addition of material to the baseline design to then cut the tower features into. Care must be taken with this method not to damage the coating during manufacture.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly comprising
a turbine wheel assembly including a disk and a plurality of blades that extend outwardly from the disk in a radial direction away from an axis, and
a turbine shroud that extends around the blades of the turbine wheel assembly to block gasses from passing over the blades during operation of the turbine assembly,
wherein the turbine shroud includes a plurality of blade track segments arranged circumferentially adjacent to one another about the axis to form a ring around the axis, each blade track segment includes a runner that forms a primary track surface facing the axis and spaced a first radial distance from the axis, and at least one of the plurality of blade track segments includes a first marker arranged radially outward of the blades included in the turbine wheel assembly that forms a plurality of rub indication surfaces each spaced a different radial distance from the axis than the primary track surface so that an approximate rub depth of the turbine wheel assembly into the blade track caused by turbine wheel assembly rotation within the turbine shroud during operation of the turbine assembly can be determined by visually observing the first marker, wherein the first marker includes a plurality of pedestals that each form one of the plurality of rub indication surfaces and a plurality of cutouts that each form one of the plurality of rub indication surfaces, the plurality of rub indication surfaces includes a first rub indication surface formed by a first pedestal included in the plurality of pedestals and a second rub indication surface formed by a first cutout included in the plurality of cutouts, and the first rub indication surface and the second rub indication surface are located at a second radial distance from the axis that is different than the first radial distance.

2. The turbine assembly of claim 1, wherein each rub indication surface formed by one of the plurality of pedestals is closer radially to the axis than the primary track surface.

3. The turbine assembly of claim 2, wherein each rub indication surface formed by one of the plurality of cutouts is farther radially from the axis than the primary track surface.

4. The turbine assembly of claim 1, wherein the at least one of the plurality of blade track segments further includes a plurality of markers that includes the first marker and that each of the plurality of markers forms a plurality of rub indication surfaces each spaced a different distance from the axis than the primary track surface.

5. The turbine assembly of claim 1, wherein the plurality of rub indication surfaces includes a third rub indication surface formed by a second pedestal and a fourth rub indication surface formed by a second cutout and the third and fourth rub indication surfaces are located at a third radial distance from the axis that is different than the first radial distance and the second radial distance.

6. The turbine assembly of claim 1, wherein the primary track surface includes a generally frustoconical surface and a generally cylindrical surface, the plurality of pedestals are positioned on the generally frustoconical surface, and the plurality of cutouts are formed in the generally cylindrical surface.

7. A turbine shroud comprising
a plurality of blade track segments arranged circumferentially adjacent to one another about an axis to form a ring around the axis,
wherein each blade track segment includes a runner that forms a primary track surface facing the axis and spaced a first radial distance from the axis,
wherein at least one of the plurality of blade track segments includes a first marker that forms a plurality of rub indication surfaces each spaced a different distance from the axis than the primary track surface,
wherein the first marker includes a plurality of pedestals that each form one of the rub indication surfaces and each rub indication surface formed by the plurality of pedestals is closer to the axis than the primary track surface,
wherein (i) the first marker includes a plurality of cutouts that each form one of the rub indication surfaces and each rub indication surface formed by the plurality of cutouts is farther from the axis than the primary track surface, and (ii) the plurality of cutouts are arranged axially forward of the plurality of pedestals.

8. The turbine shroud of claim 7, wherein the at least one of the plurality of blade track segment further includes a plurality of markers that includes the first marker.

9. The turbine shroud of claim 8, wherein the plurality of markers included in the at least one of the plurality of blade track segments includes three markers which include the first marker and the at least three markers are spaced circumferentially from one another.

10. The turbine shroud of claim 7, wherein the runner of the at least one blade track segment includes a base portion and a coating applied to the base portion and a first portion of the coating forms the rub indication surfaces.

11. The turbine shroud of claim 10, wherein the base portion of the runner is made from a ceramic matrix composite material.

12. The turbine shroud of claim 10, wherein a second portion of the coating forms the primary track surface.

* * * * *